A. P. WOLFE.
MACHINE FOR SNIPPING STRING BEANS.
APPLICATION FILED AUG. 25, 1919.
1,396,080.
Patented Nov. 8, 1921.
2 SHEETS—SHEET 2.
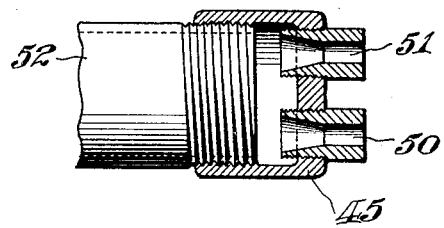
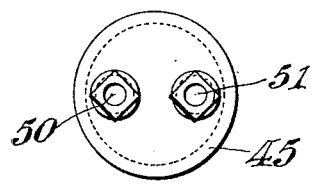
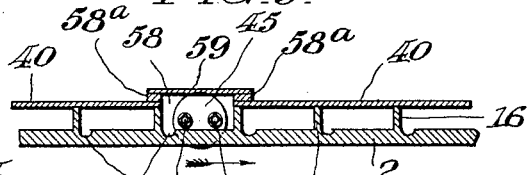
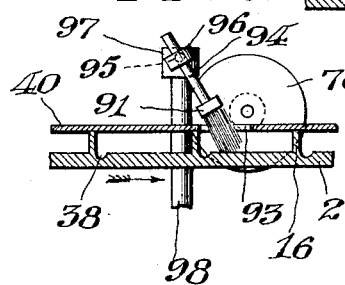
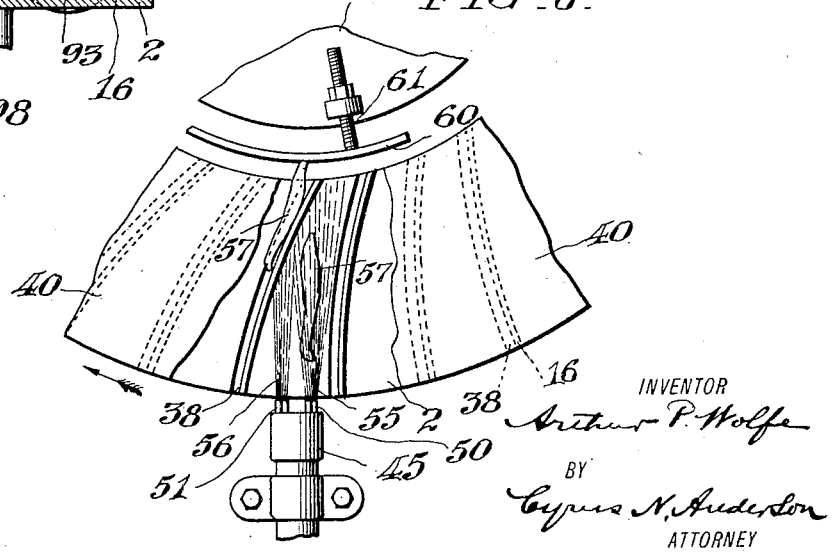
INVENTOR
Arthur P. Wolfe
BY
Cyrus N. Anderson
ATTORNEY

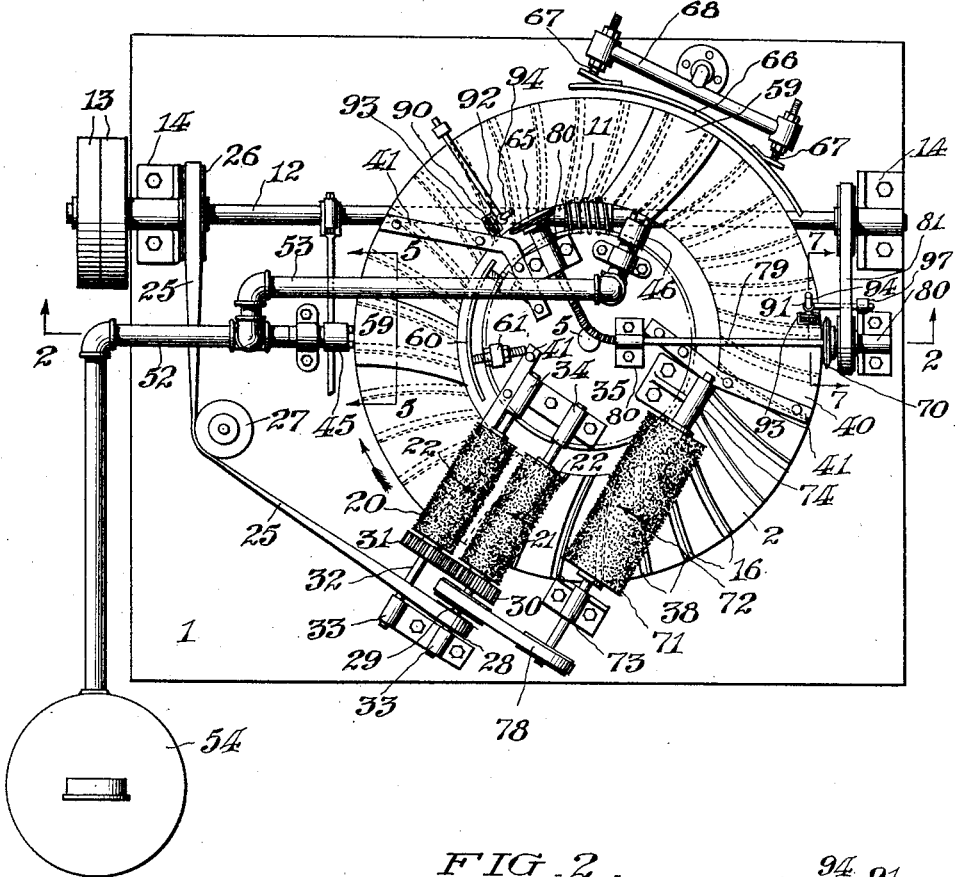

UNITED STATES PATENT OFFICE.

ARTHUR P. WOLFE, OF PHILADELPHIA, PENNSYLVANIA.

MACHINE FOR SNIPPING STRING-BEANS.

1,396,080.  Specification of Letters Patent.  Patented Nov. 8, 1921.

Application filed August 25, 1919.  Serial No. 319,603.

*To all whom it may concern:*

Be it known that I, ARTHUR P. WOLFE, a citizen of the United States, and a resident of Philadelphia, in the county of Philadelphia and State of Pennsylvania, have invented an Improvement in Machines for Snipping String-Beans, of which the following is a specification.

This invention relates to machines for snipping off the ends of string beans and other articles for which it may be adapted.

In the machine in which the invention is shown as being embodied, a movable carrier is provided having a series of pockets into which the beans or other articles, the ends of which are to be trimmed or snipped off, are deposited and are conveyed by the said carrier succesively to cutters or trimmers, by which first one end and then the other are trimmed off.

One of the objects of the invention is to provide a positive and efficient means by which the said beans may be shifted in the pockets in which they may be situated transversely of the carrier in opposite directions, to present first one end to a cutter and thereafter to present the other end to a cutter, so that both ends are thereby snipped or trimmed off.

A further object of the invention is to provide means whereby air or gas may be employed efficiently for effecting movement of the said beans transversely of the carrier to present the opposite ends thereof to the cutters as above described.

Another object of the invention is to provide practical means for holding the beans while the respective ends thereof are being trimed or snipped off by the cutters provided for that purpose.

Other objects and advantages of the invention will be referred to in the detailed description thereof which follows or will be apparent from such description.

In order that the invention may be understood and its practical advantages and featues of construction fully appreciated, reference may be had to the accompanying drawings, in which I have illustrated a convenient form of embodiment thereof. However, it will be understood that changes in the details of construction may be made within the scope of the claims without departing from the invention.

In the drawings:

Figure 1 is a top plan view of a machine embodying my invention;

Fig. 2 is a transverse, sectional view taken on the line 2—2 of Fig. 1;

Fig. 3 is a sectional view showing a detail of construction of means for producing air or gas jets to effect movements of beans or other articles transversely of the carrier;

Fig. 4 is a view in end elevation looking toward the left in Fig. 3;

Fig. 5 is a transverse, sectional view taken on the line 5—5 of Fig. 1;

Fig. 6 is a top plan view of a portion of the machine including the carrier with certain parts broken away to illustrate the action of the air or gas jet in effecting movement of the beans transversely of the carrier; and Fig. 7 is a transverse, sectional view taken on the line 7—7 of Fig. 1 for the purpose of showing more clearly the means for holding the beans in position while the ends thereof are being snipped or trimmed off.

Referring to the drawings: 1 designates a table on which the various operative parts of the apparatus or machine are supported. The table may be supported upon legs or otherwise, as desired. 2 designates a carrier supported upon the outer ends of spokes 3 which extend radially from a hub or sleeve 4, revolubly supported upon a central supporting post or shaft 5 mounted and supported in a pedestal 6 which is in turn secured to and supported upon the table 1. 10 designates a gear secured to the sleeve 4 and is adapted to be driven by a worm 11 upon a shaft 12 driven by means of a driving belt, not shown, which is adapted to engage the fast and loose pulleys 13 upon the outer end thereof. The shaft 12 is supported in bearings 14 upon the table 1. Rotation of the shaft 12 effects rotation or revolution of the annular carrier 2 which may be described generally as of dial shape.

The beans or other articles, the opposite ends of which are to be trimmed or snipped off, are deposited upon the carrier between the ribs 16 thereon by means of the rotatable feed brushes 20 and 21, which brushes rotate toward each other as indicated by the arrows 22 thereon. Rotation of the brushes 20 and 21 is effected by means of a belt 25 which extends over a wheel 26 upon the shaft 12 and in contact with idle guide rollers 27 and over a wheel 28 upon the shaft 29 upon which the brush 21 is mounted. The brush 20 is driven by means of gears 30 and 31, the former being upon the shaft 29 and the latter upon the shaft 32 upon which the brush 20 is mounted. The outer ends of the shafts 29 and 32 are supported in bearings 33 upon the table 1, while the inner ends thereof are supported in bearing 34 upon a platform 35 supported upon the post 5 above the sleeve 4. The platform or table 35 is held stationary upon the post 5 by means of a binding screw 36. The beans may be supplied to the said brushes by any suitable means such as shown in my co-pending application, Sr. No. 317,030, which has eventuated into Patent No. 1,359,559, dated Nov. 23, 1920.

The ribs 16 instead of extending radially with respect to the center of the carrier 2 are curved as indicated in Fig. 1 so as to be more apt to fit the curvature which is present generally in string beans.

38 designates grooves in the top side of the carrier 2, the said grooves being situated adjacent and in parallel relation to the respective ribs 16 and being upon the forward side thereof; that is, upon the side facing the direction of movement of the carrier. These grooves are adapted to receive the beans after or as they are deposited upon the carrier 2.

40 designates a cover which extends over the greater portion of the carrier 2, the said cover preferably being in contact with the top edges of the ribs 16. The said cover is supported at its opposite ends and intermediate its ends by means of brackets 41 secured at their inner ends to the platform or table 35.

The cover, contacting with the top edges of the ribs 16, forms therewith and with the portions or sections of the carrier intermediate the said ribs, pockets which are closed except at their outer and inner ends. The cover is stationary and as the carrier travels along underneath the same, it contacts or is apt to contact with the tops of the beans in the pockets to cause them to position themselves in the grooves 38 adjacent the said ribs.

In order to effect movement of the beans first inwardly and then outwardly in the respective pockets transversely of the carrier, I have provided nozzles 45 and 46, the first being situated adjacent the outer periphery of the carrier in the plane of the pockets, while the second, 46, is situated adjacent the inner periphery of the annular carrier 2 also in the plane of the pockets, the former nozzle facing inwardly and the latter nozzle facing outwardly. Each of the said nozzles is provided with restricted or throttled openings 50 and 51, said openings of each nozzle being arranged in spaced relation to each other and in the same horizontal plane intermediate the top and bottom sides of the respective pockets, but nearer the bottom sides. Air or gas is supplied through the restricted or throttled openings 50 and 51 from pipes 52 and 53 having relatively large diameters. The latter pipe is a branch from the pipe 52. The air or gas for forming the jets discharged from the restricted or throttled openings 50 and 51 is supplied from a tank or holder 54 in which it is contained under such pressure as may be desired.

The air or gas may be supplied under pressure to the holder or tank 54 by any means which may be found to be desirable or suitable.

As the carrier moves along, the beans in the respective pockets are first brought under the influence of the jets 55 and 56 discharged from the restricted or throttled openings 50 and 51. The respective beans, a couple of which are indicated at 57 in a couple of adjacent pockets, are first brought under the influence of and are acted upon by the jet 55 which starts and may complete movement thereof to the inner end of the pocket and effect the pressing of the same against the gage 60. At such time, if the bean being acted upon by the jet 55 has not been positioned in the groove 38 provided for it, the air or gas from the jet 56 striking the rear side of a rib 16, is deflected and tends to cause lateral movement of the bean to position the same in such groove. In case a bean should not be moved inwardly by the first jet 55 sufficiently to cause its inner end to contact with the gage 60, the second jet 56, acting thereon, will complete the movement.

It will be noted that the jets of air or gas 55 and 56 being discharged into a pocket opposite the throttled or restricted openings 50 and 51, operate in a way similar to that of a steam aspirator and cause a stream of air or gas to flow rapidly through the pocket into which the said jets are being discharged. It will be noted also that the jets strike the ends of the beans with considerable force, depending upon the speed of movement of the air or gas in the jets.

In order to provide additional space in the pocket into which the jets of air or gas from the restricted or throttled openings 50 and 51 issue, I have slotted the cover 40 as indicated at 58, the said slot corresponding to the contour and direction of the spaces between the ribs 16, and have provided adjacent the edges of said slot supporting strips or pieces 58ª upon which the opposite edges of a bridge member 59 are supported. By elevating the cover over the top of the pocket into which the jets of air or gas are discharged, the beans are given more room which is necessary on account of the variation in curvature thereof, thereby reducing to a minimum the friction betwen the beans and the inclosing surfaces of the pocket.

It may be noted at this point that the gage 60 is adjustably supported by means of the supports 61 in adjacent relation to the inner edge of the carrier 2. The beans, after having been moved into the position indicated by the left hand bean in Fig. 1, are carried forward with their inner ends in contact with the gage 60 to a rotatable or revoluble cutter 65, situated adjacent the inner edge of the carrier 2. Contact of the cutting edge of this cutter with the bean effects the trimming or snipping off of the same. The beans are carried forward by the carrier until they are brought under the influence of the restricted or throttled openings in the nozzle 46. The jets of air or gas issuing from these throttled openings into the inner ends of the pockets as they are formed in opposite relation to the said nozzle, shift the beans outwardly to press their outer ends against the gage 66 supported upon the adjustable supports 67, which are in turn secured to the support 68. The beans are carried forward to the rotary cutter 70 situated adjacent the outer periphery of the carrier 2, which operates to trim or snip off their outer ends. They are then carried forward and are discharged from the carrier by means of a brush 71 which rotates in the direction of the arrow 72 thereon, the shaft of said brush being supported in bearings 73 and 74, the first being supported upon the table 1 and the latter upon the platform or table 35. The brush 71 is driven from the shaft 29 by means of a belt 78 which passes over wheels upon the respective shafts of the said brushes as shown in Fig. 1. The brush 71 also operates to keep the carrier 2 clean and bright.

The cutters 65 and 70 are mounted upon a common shaft 79, a portion of which is flexible, which shaft is mounted in bearings 80. Said shaft is driven from the shaft 12 by means of a driving belt 81 which passes over wheels on the respective shafts 12 and 79 as shown.

It is desirable that means be provided for holding the respective beans as their inner and outer ends are being trimmed or snipped off. As far as I am aware, no satisfactory means for this purpose has heretofore been found. The means which I have provided and which I employ for that purpose has been found to operate positively and efficiently.

For this purpose I have provided brushes 90 and 91 which are situated above the carrier 2. Said brushes are arranged at acute angles with respect to the carrier 2 and their lower ends extend through openings 92 and 93 in the cover 40 adjacent the cutters 65 and 70. The brushes are inclined in such direction that they readily sweep over the carrier 2 and the ribs 16 thereon, and contact with the beans which may be situated in the pockets and press the same against the respective ribs 16 as their inner or outer ends are being trimmed or snipped off. The brushes contact with the beans adjacent the ends which are being trimmed or snipped off. Preferably the brushes should be adjustably supported so that their angular and other positions with relation to the carrier 2 may be varied or adjusted.

In the construction shown, each brush is provided with a stem 94 which is rotatably secured in an opening 95 in a holder 96 which in turn is supported by a support or holder 97. Each holder 96 is rotatable and is also adjustable longitudinally in its support 97. The supports 97 are supported respectively upon the uprights or posts 98 as shown.

It will be seen that I have combined a number of elements or parts in a way to produce a single unitary structure which operates efficiently to effect the purposes for which the said machine is designed.

I claim:

1. In a machine for trimming or snipping off the ends of string beans, the combination of a traveling carrier provided with pockets upon its top side separated by ribs and arranged in a row lengthwise thereof and adapted to receive and support said beans, means for shifting the said beans transversely of said carrier into positions to have their opposite ends trimmed or snipped off, cutters for trimming or snipping off said ends, and brushes arranged at an angle to and extending transversely of said carrier, the bristles of the said brushes yielding as the ribs pass thereunder so that portions of the bristles of the brushes will occupy positions on opposite sides of the respective ribs, those on one side contacting with and holding the beans until the ends adjacent the brushes are snipped off.

2. In a machine for trimming or snipping off the ends of string beans, the combination of an annular carrier provided with pockets in its top side arranged in a row lengthwise thereof and adapted to receive and support said beans, a cover for closing the top sides of said pockets, means for shifting the said beans first in one direction and then in the opposite direction, transversely of the said carrier, to place their ends in positions to be trimmed or snipped off, means for trimming or snipping off the said ends, and adjustable yielding means arranged at an angle to and extending transversely of said carrier for engaging the said beans adjacent the ends to be trimmed or snipped off for holding the same during the time of trimming or snipping the same.

3. In a machine for trimming or snipping off the ends of string beans, the combination of a carrier provided with pockets in its top side arranged in a row lengthwise thereof and adapted to receive and support said beans, a cover for closing the top sides of said pockets, means for shifting the said beans first in one direction and then in the opposite direction, transversely of the said carrier, to place their ends in positions to be trimmed or snipped off, means for trimming or snipping off the said ends, and brushes adjustably supported above the said carrier and in angular relation with respect thereto and projecting through openings in the said cover into position to engage the said beans for holding the same while the ends thereof are being trimmed or snipped off.

4. In a machine for trimming or snipping off the ends of string beans, the combination of a carrier provided with pockets in its top side arranged in a row lengthwise thereof and adapted to receive and support said beans, a cover for closing the top sides of said pockets, means for shifting the said beans first in one direction and then in the opposite direction, transversely of the said carrier, to place their ends in positions to be trimmed or snipped off, means for trimming or snipping off the said ends, brushes situated above and in angular relation with respect to the said carrier, said brushes extending through openings in the said cover into contact with the said carrier to engage the beans while their ends are being trimmed or snipped off, and universal adjustable means for supporting the said brushes.

5. In a machine for trimming or snipping off the ends of beans, the combination of a traveling carrier provided with a plurality of pockets arranged in a row lengthwise thereof and adapted to receive and support said beans, a cover situated over a portion of said carrier and adapted to close the top sides of a greater or less number of said pockets, leaving the opposite ends thereof open, pipes terminating adjacent the opposite edges of the said carrier and in different positions with respect to the length thereof, the closed end of each of said pipes being provided with restricted or throttled orifices arranged in a horizontal plane, means for projecting jets of air or gas from the said orifices into and lengthwise of the said pockets successively as they travel past said orifices to shift the beans therein transversely of the said carrier into positions to have their opposite ends trimmed or snipped off, means for trimming or snipping off the said ends, and brushes for contacting with and holding the said beans while their ends adjacent the said brushes are being trimmed or snipped off.

6. In a machine for trimming or snipping off the ends of beans, the combination of a traveling carrier provided with a plurality of pockets arranged in a row lengthwise thereof and adapted to receive and support said beans, a cover situated over a portion of said carrier and adapted to close the top sides of a greater or less number of said pockets, leaving the opposite ends thereof open, pipes terminating adjacent the opposite edges of the said carrier and in different positions with respect to the length thereof, the closed ends of each of said pipes being provided with restricted or throttled orifices, means for projecting jets of air or gas from the said orifices into the said pockets successively as they travel past said orifices to shift the beans therein transversely of the said carrier into positions to have their opposite ends trimmed or snipped off, means for trimming or snipping off the said ends, and brushes angularly arranged with respect to the said carrier and adapted to contact with the said beans to hold the same while the ends thereof are being trimmed or snipped off.

7. In a machine for trimming or snipping off the ends of beans, the combination of a traveling carrier provided with a plurality of pockets arranged in a row lengthwise thereof and adapted to receive and support said beans, a cover situated over a portion of said carrier and adapted to close the top sides of a greater or less number of said pockets, leaving the opposite ends thereof open, pipes terminating adjacent the opposite edges of the said carrier and in different positions with respect to the length thereof, the closed ends of each of said pipes being provided with restricted or throttled orifices, means for projecting jets of air or gas from the said orifices into the said pockets successively as they travel past said orifices to shift the beans therein transversely of the said carrier into positions to have their opposite ends trimmed or snipped off, means for trimming or snipping off the said ends, brushes angularly arranged with respect to the said carrier and adapted to contact with the said beans to hold the same while the ends thereof are being trimmed or snipped off, and adjustable means for supporting said brushes.

8. In a machine for trimming or snipping off the ends of beans, the combination of a traveling carrier provided with pockets arranged in a row lengthwise of the line of movement of said carrier and adapted to receive and support the said beans, the opposite sides of said pockets being curved so that the said pockets are inclined with respect to the length of said carrier, a member situated above a greater or less portion of said carrier and adapted to close the top sides of a greater or less number of the said pockets, leaving the opposite ends thereof open, means situated on opposite sides of said carrier in horizontal alinement with the said pockets for projecting jets of air or gas successively into said pockets in opposite directions, the said jets of air or gas being adapted to shift the said beans transversely of the said carrier so as to cause their opposite ends to extend alternately beyond the opposite edges of said carrier, and the said jets of air or gas being adapted to strike the concave-curved side of the successive pockets and being thereby deflected to effect lateral movement of a bean therein toward the opposite side of said pocket, cutters for trimming or snipping off the ends of said beans, gages for directing the said ends to the said cutters, and yielding means for contacting with and holding the said beans while their ends are being trimmed or snipped off.

9. In a machine for trimming or snipping off the ends of string beans, the combination of a flat traveling carrier having ribs at intervals extending transversely thereof, said ribs forming pockets which are adapted to receive the said beans, means for causing traveling movement of said carrier, cutters for snipping off the ends of said beans, and brushes extending transversely of said carrier, the ends of the bristles of said brushes being situated in operative relation to the face of said carrier and contacting with the ends of the beans which are to be snipped off to move the same toward the sides of the end portions of the ribs adjacent the cutters as the said carrier moves forward underneath the said brushes and hold the said beans against the said ribs while the ends thereof are being snipped off by said cutters.

10. In a machine for snipping off the ends of string beans, the combination of a traveling carrier having upwardly projecting ribs at intervals which extend transversely thereof, said ribs forming pockets which are adapted to receive the said beans, cutters situated upon opposite sides of said carrier, said cutters being separated from each other a suitable interval in the direction of the length of said carrier, means for shifting the said beans longitudinally in the said pockets first in one direction and then in the other, and brushes situated above and extending transversely of said carrier, the ends of the bristles thereof being situated in adjacent relation to the face of said carrier and being adapted to contact with and sweep over the said ribs as the said carrier travels forward underneath the said brushes, the said brushes contacting with the end portions of the beans adjacent the cutters and moving the same into juxta-position with respect to the sides of the end portions of the said ribs adjacent the said cutters, and the said brushes operating to hold said end portions of the beans while their sides of the end portions are being snipped off by the said cutters.

In testimony that I claim the foregoing as my invention, I have hereunto signed my name this 15th day of August, A. D. 1919.

ARTHUR P. WOLFE.